United States Patent
Mangas et al.

(10) Patent No.: US 11,334,588 B1
(45) Date of Patent: May 17, 2022

(54) ANALYSIS ENGINE DATA INTAKE

(71) Applicant: Amazon Technologies, Inc., Seattle, WA (US)

(72) Inventors: Julio Delgado Mangas, Redmond, WA (US); Antoun Joubran Kanawati, Seattle, WA (US); Omer Baluch, Seattle, WA (US); Kiran-Kumar Muniswamy-Reddy, Sammamish, WA (US); Mukul Vijay Karnik, Redmond, WA (US); Si Yin, Seattle, WA (US); Vishal Parakh, Seattle, WA (US); Ajay Gopalakrishnan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 103 days.

(21) Appl. No.: 15/613,859

(22) Filed: Jun. 5, 2017

(51) Int. Cl.
| | |
|---|---|
| *G06F 16/23* | (2019.01) |
| *G06F 16/25* | (2019.01) |
| *H04L 67/75* | (2022.01) |
| *G06F 16/28* | (2019.01) |
| *G06F 16/245* | (2019.01) |

(52) U.S. Cl.
CPC ........ *G06F 16/254* (2019.01); *G06F 16/2365* (2019.01); *G06F 16/245* (2019.01); *G06F 16/28* (2019.01); *H04L 67/36* (2013.01)

(58) Field of Classification Search
CPC ... G06F 16/254; G06F 16/245; G06F 16/2365
See application file for complete search history.

(56) References Cited

U.S. PATENT DOCUMENTS

| | | | |
|---|---|---|---|
| 2001/0013030 | A1 | 8/2001 | Colby et al. |
| 2011/0196857 | A1* | 8/2011 | Chen ................ G06F 16/24539 707/714 |
| 2011/0202329 | A1 | 8/2011 | Goodnight et al. |
| 2012/0047158 | A1* | 2/2012 | Lee .................... G06F 16/24545 707/759 |
| 2016/0019249 | A1 | 1/2016 | Gunjan |
| 2016/0350305 | A1 | 12/2016 | Shen et al. |
| 2016/0350393 | A1 | 12/2016 | Zheng et al. |

\* cited by examiner

*Primary Examiner* — Loc Tran
(74) *Attorney, Agent, or Firm* — Davis Wright Tremaine LLP

(57) ABSTRACT

A data analytics system may receive query definitions from which relationships between datasets may be identified. The query definitions may be analyzed to determine estimated costs and frequencies of combining a first and second dataset. Based on the cost and frequency, a combined dataset may be generated to by joining data from the first and second datasets. The combined dataset may be stored. Queries that comprise instructions to combine the first and second datasets may be processed by instead accessing the combined dataset.

20 Claims, 9 Drawing Sheets

ANALYSIS ENGINE DATA INTAKE

BACKGROUND

Data analytics may now be provided to customers through the use of hosted computing services. Traditionally, such systems have employed data warehouse architectures in which large quantities of data are loaded from a transactional database into the data warehouse through an extract, transform, and load ("ETL") process. Because the ETL process has typically been relatively slow and is performed only periodically, there has often been a significant delay between the time information was first acquired and the time that analytical insights could be gleaned from it.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Disclosed herein are systems, methods, and computer program products related to data analytics, and in particular to the process of incorporating data into a data warehouse or other system for data analysis. Traditionally, the process of incorporating data into a data warehouse has been relatively slow compared to the pace at which data is acquired in transactional systems. Improvements to the data intake portions of a data warehouse may reduce the length of time between when data is first acquired and the time that insights based on the data may be made.

In an embodiment, a system for performing data analytics incorporates data from one or more sources and performs analytical operations on the data. The analytics may be provided as a service, in which one or more analytical goals are provided a priori along with the selection of the data sources to which the analytical goals are to be applied. The system may leverage the a priori specification of the analytical goals to improve subsequent data processing. In an embodiment, this information is leveraged to selectively pre-materialize combinations, sometimes referred to as joins, between selected datasets.

In an embodiment, a system may comprise a memory on which instructions may be stored. The memory may comprise instructions which, if executed by a processor, cause the system to generate a dataset based on a combination of a first and second dataset. The combined dataset may be generated based at least in part on a cost and a frequency of performing the combination. The combinations most likely to impact performance—such as those that are expensive and/or frequent—may be materialized proactively. In an embodiment, the cost and frequency may be estimated based on the analytical goals supplied a priori to the system. In an embodiment, the goals are supplied as query language expressions which may be analyzed to estimate cost and frequency.

In an embodiment, the instructions, if executed by the processor, cause the system to store the combined dataset. Queries comprising instructions to join the first and second datasets may be processed by instead accessing the stored, combined dataset instead of performing the combination.

Figure 1:
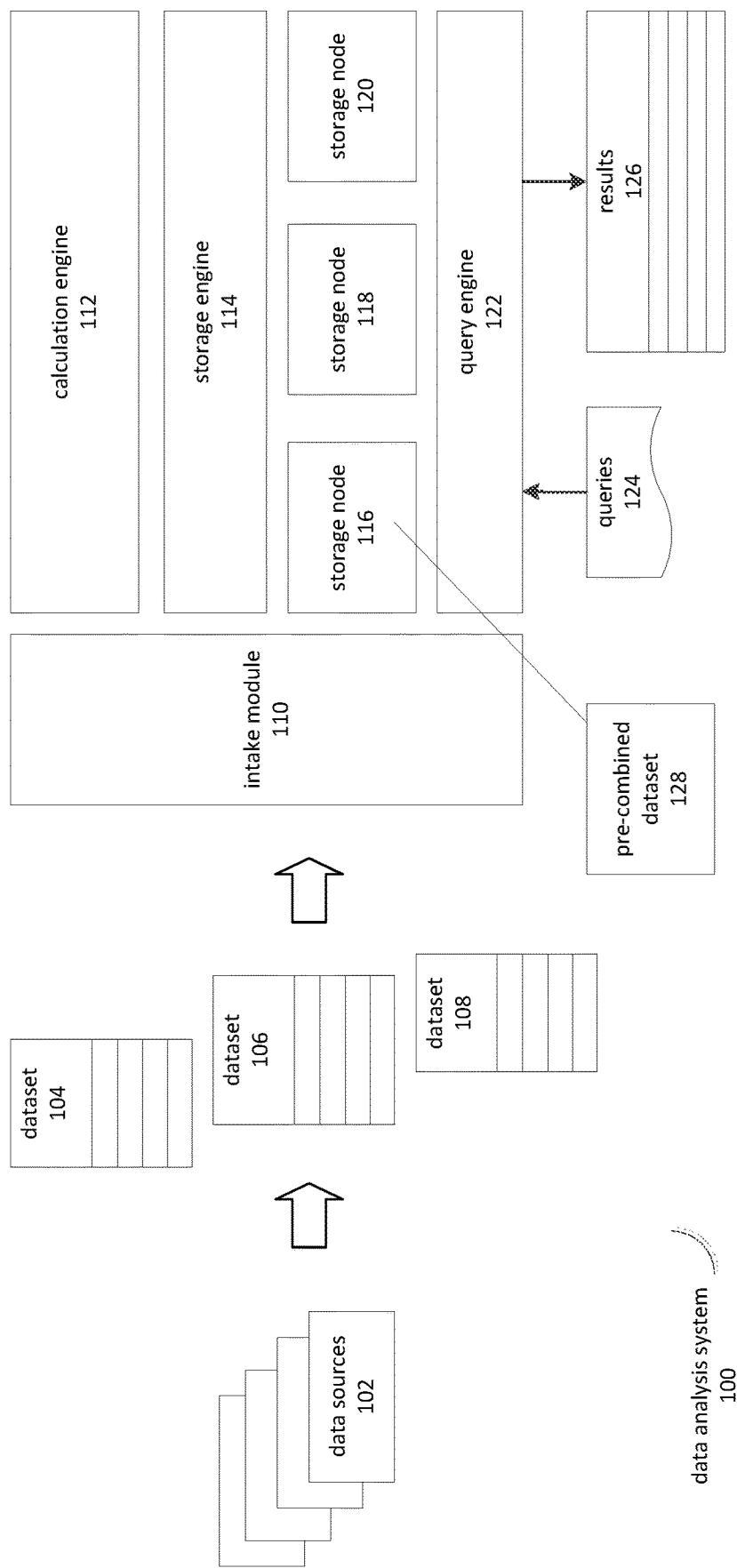
FIG. 1 is a block diagram depicting an embodiment of a data analysis system.

FIG. 1 is a block diagram depicting an embodiment of a data analysis system. An embodiment of data analysis systems may comprise subsystems for data intake, data storage, calculations, analysis, and so forth. Examples of data analysis systems include, but are not limited to, online analytical processing ("OLAP") systems, data warehouses, data mining systems, machine learning systems, and so on.

In an embodiment, a data analysis system 100 comprises an intake module 110, a calculation engine 112, a storage engine 114, storage nodes 116-120, and a query engine 122.

In an embodiment, the data analysis system 100 receives queries 124 from client applications and returns results 126. The results 126 may comprise data retrieved from the storage nodes 116-120, and may also comprise the product of various computations, aggregations, analysis, and so on.

In an embodiment, one or more of the queries 124 may be provided a priori, which is to say as a set of queries which have been designated, typically by a user or administrator of the system, as queries likely to be performed in the future. For example, in an embodiment of a hosted data analysis system, a user may request that analytical capabilities be provided based on one or more data sources, and provide indications of what the desired output of the analytical capabilities would be. In an embodiment, the indications are provided via a web-based user-interface supplied by the provider of the analytical services. The indications may also be provided, in an embodiment, as a set of explicitly defined queries.

In an embodiment, a history of the queries 124 is available. For example, in an embodiment various analytical operations may be performed and a history of the queries 124 that have been previously performed is available to the data analysis system 100. In an embodiment, the queries 124 are recorded over time as they are received and processed.

In an embodiment, the queries 124 comprise structured query language ("SQL") expressions. In an embodiment, the comprise data analysis expressions, "R" language expressions, multidimensional data analysis expressions, and so forth. It will be appreciated that these examples are intended to be illustrative, and should not be construed so as to limit the scope of the present disclosure to only the particular examples provided.

In an embodiment, the data analysis system 100 may provide analytical capabilities on data obtained through one or more data sources 102. Examples of data sources include, but are not limited to, transactional data processing systems, point-of-sale systems, real-time data streams, and so on. It will be appreciated that these examples are intended to be illustrative, and should not be construed so as to limit the scope of the present disclosure to only the particular examples provided.

In an embodiment, data from the data sources 102 may be supplied as or converted to datasets 104-108. In an embodiment, a dataset 104-108 comprises one or more rows of data. Each row may comprise one or more columns. In an embodiment, each row has corresponding columns. For example, a dataset comprising information about customers might contain a number of rows, each representing a customer. Each row may, in turn, comprise a first name column, a last name column, and a zip code. Datasets may sometimes be referred to as tables. Note, however, that the columnar structure of a dataset or table is not always regular. In an embodiment, each row may have a varying number and type of columns. These may be in different positions within the row. These types of datasets may be described as item collections, name-value collections, "NoSQL" tables, and so forth. Items in these types of datasets or tables may nevertheless be described as having columns, where a "column" corresponds to the semantic meaning of the data. For example, in an unstructured collection of data representing customer information, each item in the collection might represent a customer with first name and last name attributes. It will be appreciated that these examples are intended to be illustrative, and should not be construed so as to limit the scope of the present disclosure to only the particular examples provided.

In an embodiment, an intake module 110 may receive data obtained from the data sources 102 and oversee various processes to incorporate the received data into the data analysis system. In an embodiment, the intake module 110 receives datasets 104-108 from the data sources 102 and initiates a workflow causing the data to be loaded into one or more of the storage nodes 116-120. In an embodiment, the workflow comprises receiving the datasets 104-108, interfacing with the storage engine 114 to cause the data to be stored on one or more of the storage nodes 116-120, interacting with the calculation engine 112 to perform various analytical operations on the received data and store it on one or more of the storage nodes 116-120, and conducting performance optimization operations. In an embodiment, the performance optimization operations cause the time to "first analysis" to be reduced, such that analytical insights based on newly received data may be viewed more quickly than is typical.

In an embodiment, the intake module 110 determines that performance may be improved by pre-combining one or more of the datasets 104-108. In an embodiment, the intake module 110 determines that performance of the system 100 may be improved by pre-combining one or more of the datasets 104-108 and, in response, initiates a workflow that, when performed, causes a pre-combined version of one or more of the datasets 104-108 to be created and stored.

In an embodiment, the intake module 110 determines to pre-combine one or more of the datasets 104-108 based on an analysis that comprises identifying related columns, determining joinable datasets based on the identified column relationships, determining costs of joining the datasets, and estimating a benefit of pre-combining the datasets. In an embodiment, the analysis is performed based primarily on the queries 124. For example, in an embodiment the queries 124 might contain join operators. The join operators may be indicative both of column-relatedness and a potential benefit of pre-joining the effected columns.

In an embodiment, a pre-combined dataset 128 may be stored on one or more of the storage nodes 116-120. The pre-combined dataset 128 then be used in response to process queries 124. In an embodiment, processing of the queries 124 may comprise identifying instructions to join or otherwise combine datasets that are represented in the query, and substituting those instructions with access to the pre-combined dataset 128.

In an embodiment, the pre-combined datasets may include additional data formed by the operation of the calculation engine 112. The calculation engine 112 may, for example, calculate aggregates and form hierarchies based on a pre-combined dataset.

In an embodiment, the query engine 122 of the data analysis system 100 may identify metadata and statistics used by the intake module 110 to determine which datasets are candidates to be pre-combined, and to determine when and/or which candidate datasets to pre-combine.

Figure 2:
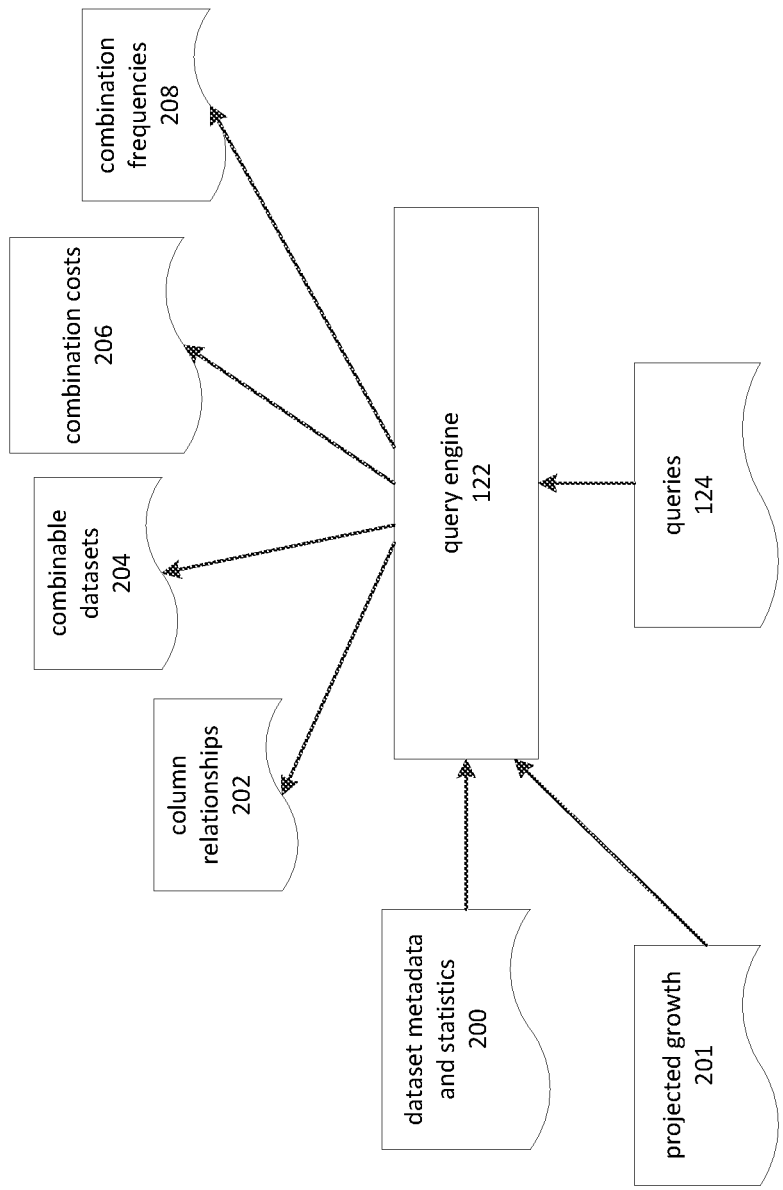
FIG. 2 is a block diagram depicting an embodiment of module that collects pre-combination metadata and statistics.

FIG. 2 is a block diagram depicting an embodiment of a module that collects pre-combination metadata and statistics. In the depicted embodiment, a query engine 122 processes queries 124. In an embodiment, processing the queries comprises forming one or more plans for executing the queries, evaluating the efficiency of the plans, and selecting one of the plans for execution. Executing the plan may typically comprise retrieving data from one or more of the storage nodes 116-120 via the storage engine 114, and may also comprise performing additional manipulations on the data, such as aggregations or further analysis. The results 126 corresponding to the queries 124 may then be made available to the submitted of the query upon completion of plan execution.

In an embodiment, the functions of the query engine 122 may sometimes be separated into additional modules. A query optimizer (not explicitly depicted in FIG. 2) may perform certain functions related to creating and evaluating the query plans, and the query engine 122 might execute the query plans in conjunction with the storage engine 114. For conciseness, FIG. 2 depicts the functions of the query analyzer as being integrated into the query engine 122, but this depiction should not be construed as limiting the scope of the present disclosure to only the depicted embodiment.

In an embodiment, the query engine 122 may identify pre-combination metadata and statistics during the steps of forming query plans and executing them. The metadata and statistics may be derived in part from inputs comprising dataset metadata 200 and the queries 124.

In an embodiment, the dataset metadata 200 comprises information describing the contents of the datasets 104-108 that are potential candidates for pre-combination. The information may, for example, provide names and data types for the columns of the datasets 104-108, information about the quantities of data already loaded or expected to be loaded, statistics regarding the time required to access the data, and so forth. In an embodiment, this data is used by the query engine 122 to formulate and evaluate query plans. In an embodiment, this data is also used to identify candidate datasets for pre-combination.

In an embodiment, the queries 124 contain information used to identify candidate datasets for pre-combination. This information may comprise join operators or other query expressions which expressly combine datasets. The information may also comprise expressions which inherently rely on combinations of datasets, or those whose performance may otherwise be improved by pre-combination. For example, sub-queries may be suggestive of an implied join operation.

In an embodiment, the query engine 122 analyzes the queries 124 and the dataset metadata and statistics 200 to produce output data which may further identification of datasets that and candidates for pre-combination.

In an embodiment, the query engine 122 may identify column relationships 202. The column relationships 202 may be those columns on which a join or other combination of datasets may be performed. In some instances, related columns may be those whose name and semantic meaning is the same. For example, each of two datasets might contain a "customer id" column which uniquely identifies a customer. In other instances, two columns may have the same semantic meaning but different names, such as "phone number" and "ph. number." In yet other cases, two columns may have different names and different semantic meaning, but still usable for combining datasets. For example, a dataset comprising a "state" column might be combinable with a dataset comprising a "zip code" column, from which the state may be derived. In an embodiment, the query engine 122 is able to identify related columns when these relationships are expressed in a set of pre-supplied queries, or available by inspection of a query history.

In an embodiment, the query engine 122 identifies a set of combinable datasets. Combinable datasets may be those having related columns. There may be a large number of potential combinations. While having a maximized number of pre-combined datasets may improve query processing performance, there may be other considerations limiting the ability or advisability of forming and storing a pre-combined dataset.

In an embodiment, the query engine 122 estimates costs for the various candidate pre-combinations. For example, the costs may reflect the computing resources necessary to form the pre-combined dataset and the costs of storing the dataset. In an embodiment, costs are calculated in terms of time-to-formation and the size of the resulting combined dataset. Note that these costs may reflect projected growth or decline of the time and or size of the combined dataset. In an embodiment, data is continually added to the system such that the projected future sizes of the datasets is considered when evaluating the cost of pre-combination. Note that "pre-combination" may refer, in some instances, to combination prior to user access to a query that relies on the combination.

In an embodiment, the query engine 122 also provides information related to expected frequencies for combinations of datasets 208. For example, in an embodiment the query engine 122 records statistics of the queries it evaluates. The statistics may note which datasets are combined and how often the combinations are done. In an embodiment, this information is linked to the combination costs, such that it may be possible to identify combinations of datasets with the greatest impact. This may include those that are executed infrequently but have high costs, or those with relatively little costs but executed so often that there impact is nonetheless high.

Figure 3:
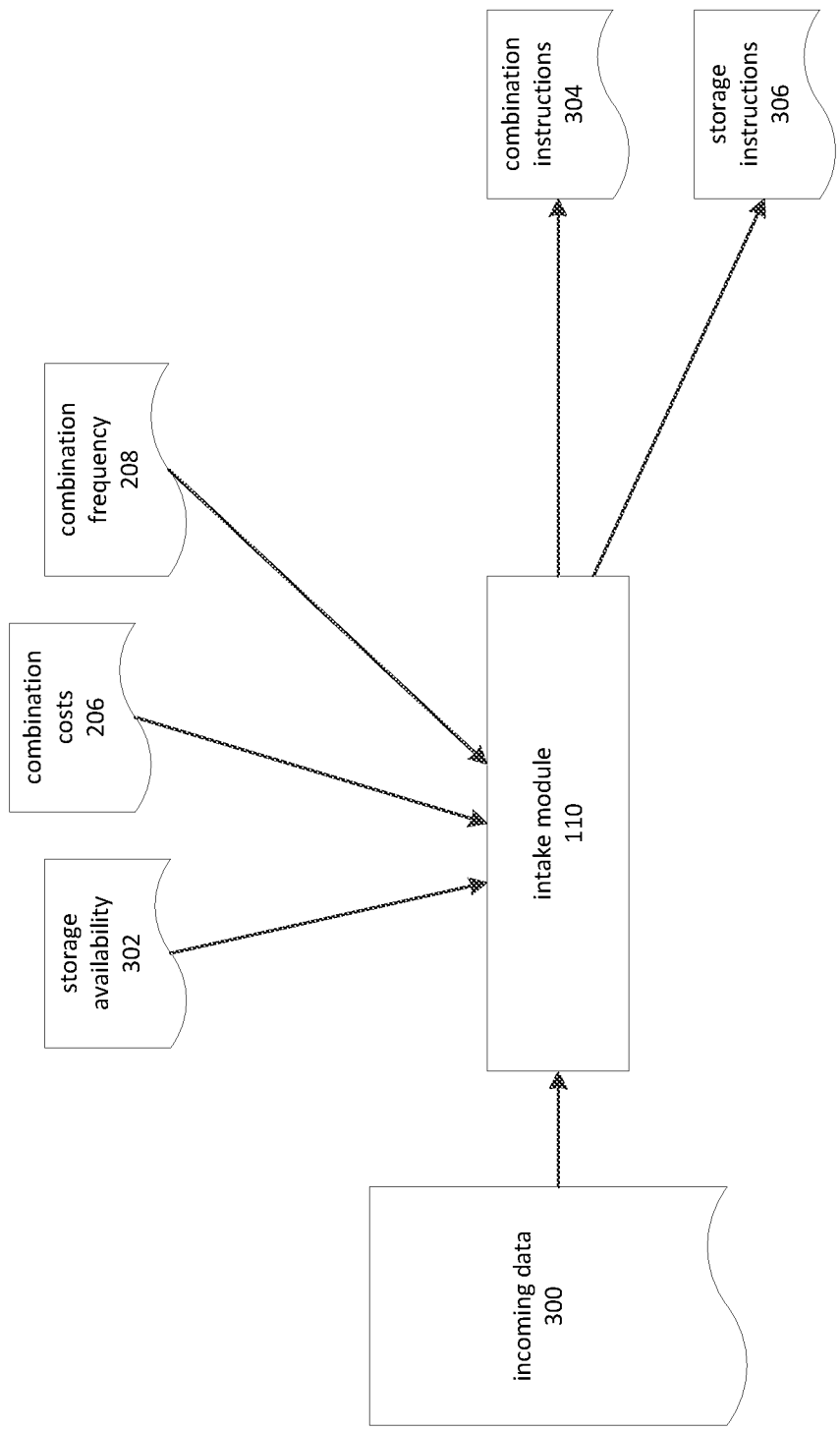
FIG. 3 is a block diagram depicting an embodiment of module that pre-combines datasets.

FIG. 3 is a block diagram depicting an embodiment of module that pre-combines datasets based on a cost-benefit analysis. In an embodiment, an intake module 110 receives incoming data 300 and outputs storage instructions 306 and pre-join instructions 304.

In an embodiment, the intake module 110 examines candidate dataset combinations and determines which, if any, should be pre-combined. The intake module 110 may consider factors including storage availability 302, combination costs 206, and combination frequency 208.

In an embodiment, a provider of data analysis services provisions an amount of storage space for storing pre-combined datasets. The storage space may be shared for other purposes, such as storing hierarchies of aggregated data. The amount of storage space may be fixed or otherwise limited. In an embodiment, storage availability is balanced with other factors to determine which candidate combinations are stored.

In an embodiment, the intake module 110 considers the cost of performing the combination 206. In an embodiment, the cost of combining two or more datasets may weigh in favor of pre-combination, since it may be more efficient to utilize a pre-combined dataset rather than combining the datasets with each query. In an embodiment, there may be limitations to the datasets that can be combined based on cost. The limitations may be imposed based on the amount of storage available. The limitations may also, in an embodiment, be imposed based on a maximum amount of permissible delay in the intake process. In an embodiment, the intake module 110 applies a budget to pre-combination, so that no more than a threshold amount of time is spent performing pre-combinations during the data intake process. The time spent performing pre-combinations may be considered in view of other intake operations, such as computing aggregates for hierarchies.

In an embodiment, the intake module 110 considers combination frequency 208. There may be certain dataset combinations that are estimated to be frequent, while others may be estimated to be performed infrequently.

In an embodiment, the factors of storage availability 302, combination costs 206, and combination frequency 208 are analyzed to select those combinations of datasets which are to be pre-combined and stored in one or more of the storage nodes 116-120.

In an embodiment, the intake module 110 selects combinations whose associated benefits exceed a threshold amount. There may, for example, be combinations having estimated benefits that are negligible. In an embodiment, the threshold may be compared to estimates of the computing capacity and/or throughput that would be consumed each time the query is to be performed. In an embodiment, the combination is not selected when this estimate is the threshold.

In an embodiment, the threshold is set at a level that compensates for potential errors in estimating the frequency with which the query may be executed. For combinations whose per-query benefit is relatively small, the benefit to pre-combining may be more sensitive to frequency-related estimation errors. The threshold for pre-combining datasets may be set, in an embodiment, to reduce the chance of a pre-combination having a negligible or even negative effect on performance.

In an embodiment, the storage instructions are indicative of where and how to store the incoming data 300. In an embodiment, this includes determining which storage node is selected, determining which datasets the incoming data will be stored in, what data types will be used, and so on. The instructions may, for example, be provided as query language commands, bulk-load protocols, application programming interface invocations, and so on.

In an embodiment, the combination instructions 304 are indicative of operations to combine and store a pre-combined dataset. In an embodiment, the combination instructions 304 comprise query language commands, such as SQL query language commands, to join two tables and to store the results on one or more of the storage nodes 116-120. In an embodiment, a workflow process is used to obtain results of a join query and propagate the results to one or more of the storage nodes 116-120.

Figure 4:
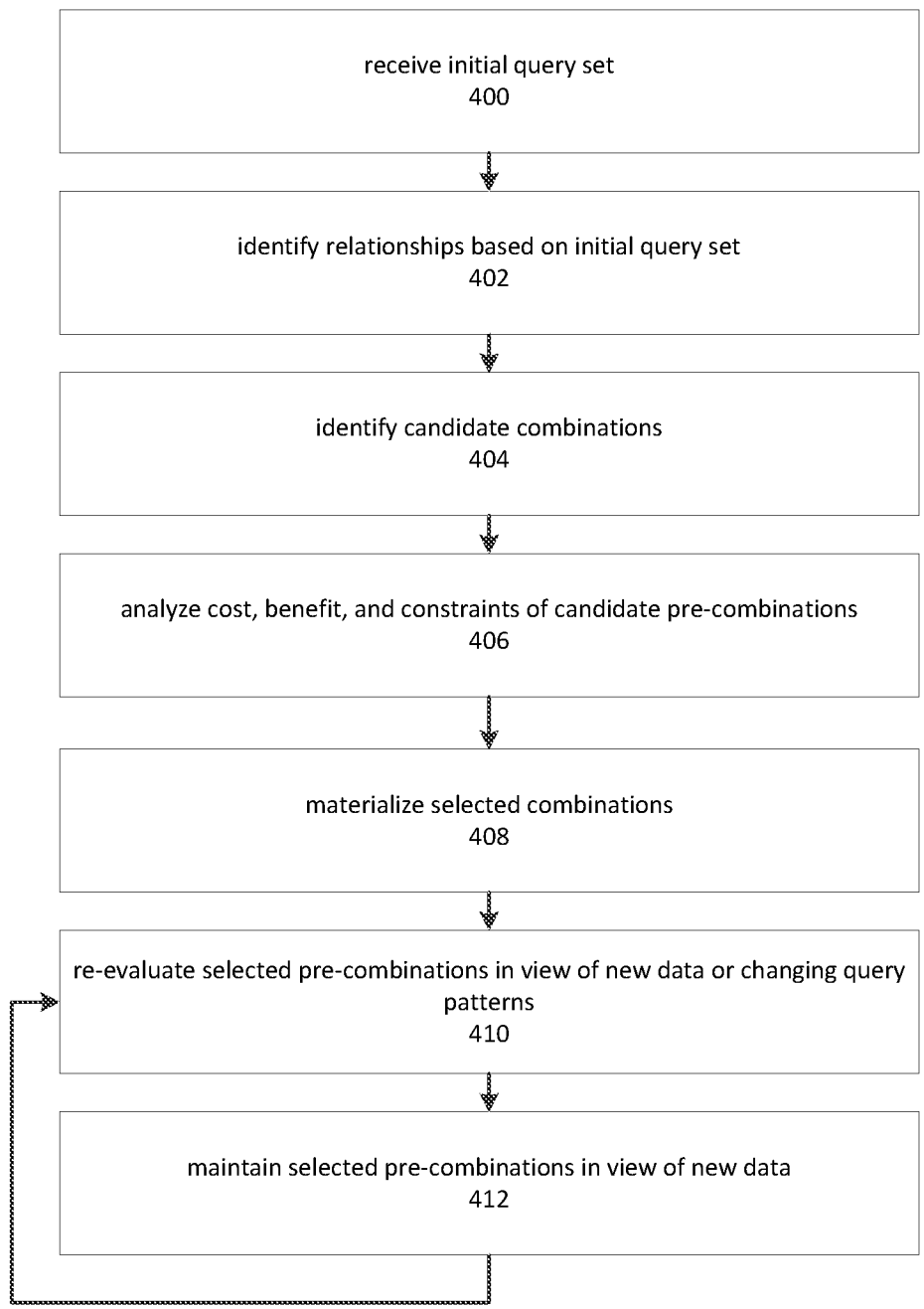
FIG. 4 is a flow diagram depicting an embodiment of a process for pre-combining datasets.

FIG. 4 is a flow diagram depicting an embodiment of a process for pre-combining datasets. Although depicted as a sequence of blocks, those of ordinary skill in the art will appreciate that the depicted order should not be construed as limiting the scope of the present disclosure to only embodiments which precisely match the depicted order, and that at least some of the operations referred to in the depicted blocks may be altered, omitted, reordered, supplemented with additional operations, or performed in parallel.

In an embodiment, an initial set of queries may be received as depicted in block 400. In an embodiment, the initial set of queries corresponds to the requirements of a data analysis service to be performed on behalf of a customer by a provider of hosted data analytics services.

In an embodiment, as depicted by block 402 the related columns and related datasets are identified based on the initial query set. In an embodiment, the relationships are identified based on their use in join clauses or other expression elements which case datasets to be combined.

In an embodiment, candidate pre-combinations are identified based on the identified relationships, as depicted by block 406. Each of the candidate pre-combinations may be analyzed to determine if the pre-combination should be materialized and stored. In an embodiment, the candidates are evaluated in view of the cost and benefits of materializing the combined dataset, and in view of various constraints such as limits on the amount of storage space. In an embodiment, the analysis may be in view of 1) the time and expense of performing the combination each time a query is evaluated, 2) the time and expense of performing the combination ahead of time, with respect to constraints on a maximum time spent performing intake procedures, 3) the amount of storage space required to store the combined dataset, with respect to limits on the amount of storage space available, and 4) the benefit of processing queries using the pre-combined dataset instead of performing the combination. It will be appreciated that these examples are intended to be illustrative, and should not be seen as limiting the scope of the present disclosure to embodiments which incorporate the provided examples.

In an embodiment, the selection is performed in view of one or more threshold values indicative of the cost of forming a combination. In an embodiment, combinations whose net cost is below a threshold value are not selected. In these cases, the net benefit of pre-generating the combination may be minimal, or even negative, due to potential errors in estimating the frequency with which the query may be executed. In an embodiment, combinations whose net cost is above a threshold value are not selected. In these cases, the intake process may impose limitations on the total amount of time that may be spent generating pre-combined datasets during the intake process.

In an embodiment, the selection is performed in view of one or more threshold values indicative of an estimated frequency of accessing the combined dataset. For example, in an embodiment combinations whose estimated frequency is below a threshold value are not selected for pre-combination. In an embodiment, combinations whose estimated frequency is above a threshold value are selected for pre-combination. In an embodiment, threshold values are defined in terms of a curve incorporating both frequency and cost factors. Various other threshold values may be incorporated. For example, in an embodiment threshold values pertaining to expected data growth rate are considered.

In an embodiment, the selected combinations of datasets are materialized as depicted by block 408. The materialization process may comprise executing instructions, such as query language expressions, to combine the datasets and store them.

In an embodiment, new data is added to the data analysis system on an ongoing basis. It may also be the case, in some embodiments, that the mixture of queries processed by the system may change over time. Block 410 depicts that an embodiment may periodically re-evaluate the selected set of pre-combined datasets in view of any new data that has arrived, or in view of changing query patterns. Thus, pre-materialized datasets may be dropped from storage when their presence is no longer as useful as would be the presence of another, alternative pre-combination. New pre-combinations may be added.

In an embodiment, the data stored in each pre-combined dataset may be updated in view of any new data that has been added. In some cases, old data may be dropped as new data is added. In an embodiment, the pre-combination is thus materialized only partially. The pre-combination may, for example, be done only with respect to more recent data.

Figure 5:
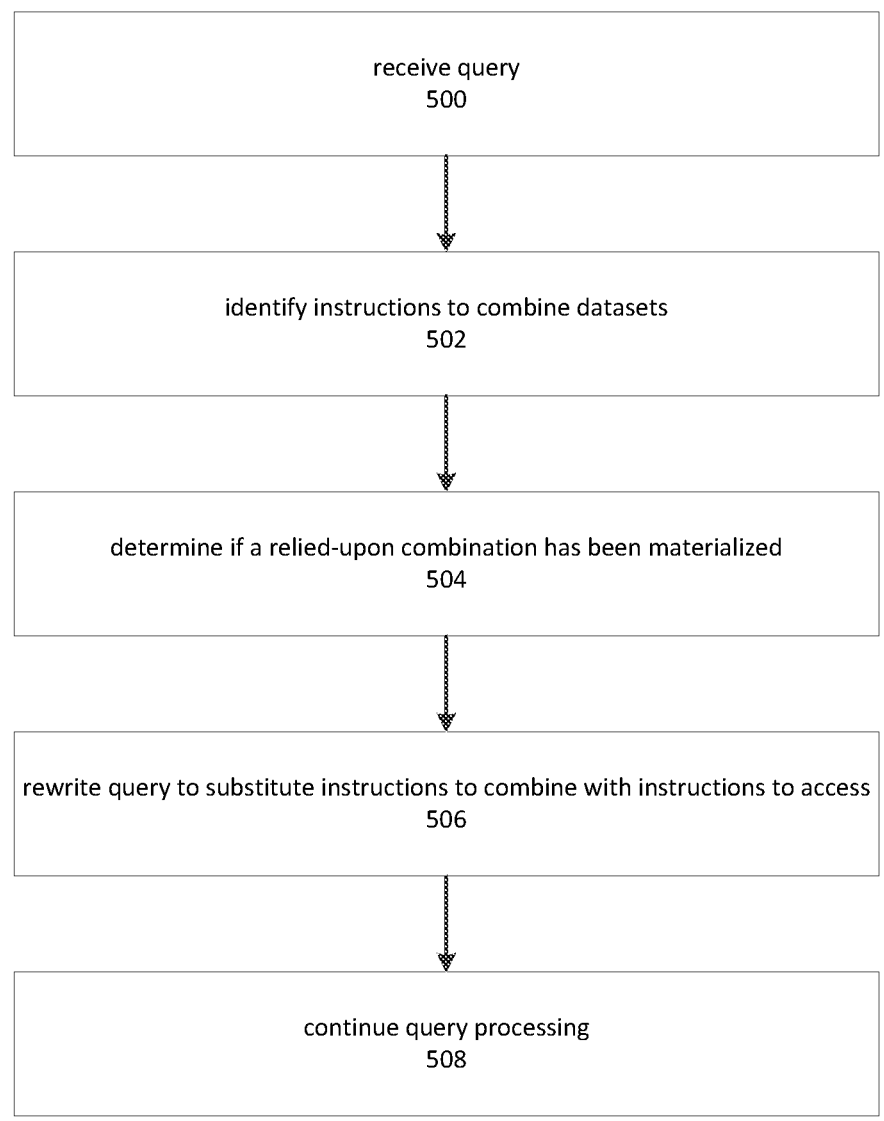
FIG. 5 is a flow diagram depicting an embodiment of a process for performing queries using pre-combined datasets.

FIG. 5 is a flow diagram depicting an embodiment of a process for performing queries using pre-combined datasets. Although depicted as a sequence of blocks, those of ordinary skill in the art will appreciate that the depicted order should not be construed as limiting the scope of the present disclosure to only embodiments which precisely match the depicted order, and that at least some of the operations referred to in the depicted blocks may be altered, omitted, reordered, supplemented with additional operations, or performed in parallel.

In an embodiment, a query is received at block 500. As used herein, receiving a query may refer to receiving instructions to perform a query. In an embodiment, the instructions may be provided as a query language expression. As used herein, receiving a query may also comprise other receiving forms, including receiving application programming interface invocations, or web service invocations, to process a query.

In an embodiment, as depicted by block 502, the received query may be analyzed to determine if it contains instructions to combine datasets. As depicted by block 504, it may then be determined if any relied upon combinations have been materialized.

In an embodiment, as depicted by block 506, the portions of the query which comprises instructions to combine a dataset may be substituted to instead access the materialized combination. In an embodiment, the query is written so that language elements which rely upon a combination performed within the query instead rely upon the materialized combined dataset. The query may then, in an embodiment as depicted by block 508, continue to be processed normally.

In an embodiment, the substitution is performed upon a query plan. For example, one or more operators of a query plan may be eliminated, altered, or rearranged to access the combined table rather than perform the combination.

In an embodiment, the substitution is performed upon a join element of a query plan. For example, the join plan may be altered or re-implemented to directly access the pre-combined table. The join element may correspond to a join of two or more datasets which have been pre-combined.

In an embodiment, joins of three or more datasets are supported. Pre-combinations of three or more datasets may be materialized. Corresponding queries may be processed in a manner similar to the process described in FIG. 5.

In an embodiment, a query may comprise a join of at least three datasets, whereas materialized pre-combinations may be available for only two of the three datasets. The pre-combination may nevertheless be used in such cases, by modifying the query to do a join between the pre-materialized combination of two of the datasets with the third dataset.

Figure 6:
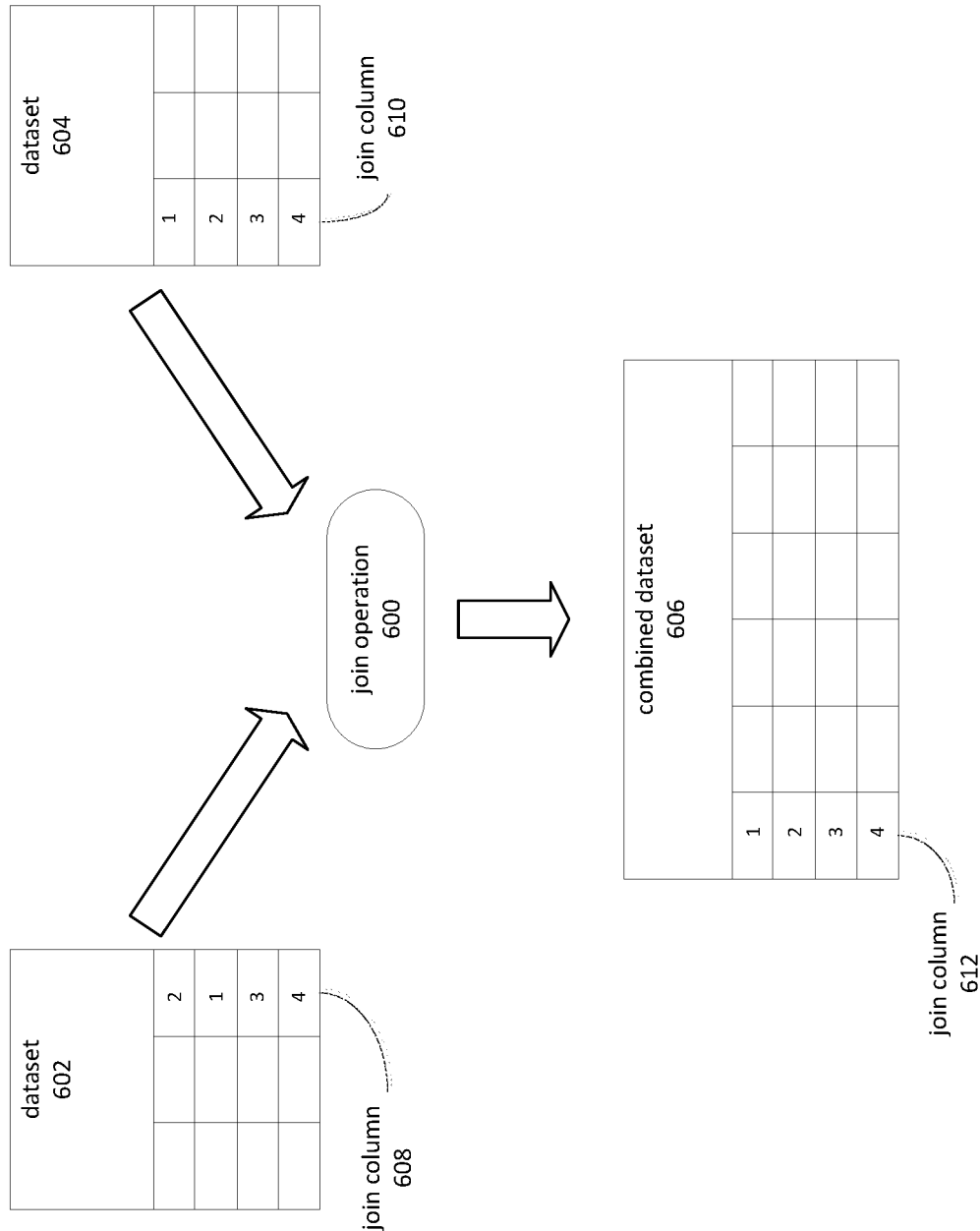
FIG. 6 is a block diagram depicting an embodiment of combining datasets.

FIG. 6 is a block diagram depicting an embodiment of combining datasets. In the depicted embodiment, an instruction to combine datasets is indicated by a join operator. When the join operator is executed, a join operation 600 is performed. The join operation 600 may, for example, combine a first dataset 602 with a second dataset 604, forming a combined dataset 606.

In the depicted embodiment, the join operation 600 is performed using a join column 608 of the first dataset 602 with another join column 610 of the second dataset 604. The join columns 608, 610 are used to match the rows of the datasets 602, 604. A row in the first dataset 602 may be combined with a row in the second dataset 604 when the rows have corresponding values in their respective join columns 608, 610. The combined dataset 606 comprises rows joined in this manner.

In an embodiment, one or more join types such as inner joins, left outer joins, right outer joins, cross-joins, and so forth may be supported. The input query set may be analyzed to determine which join types should be materialized.

Figure 7:
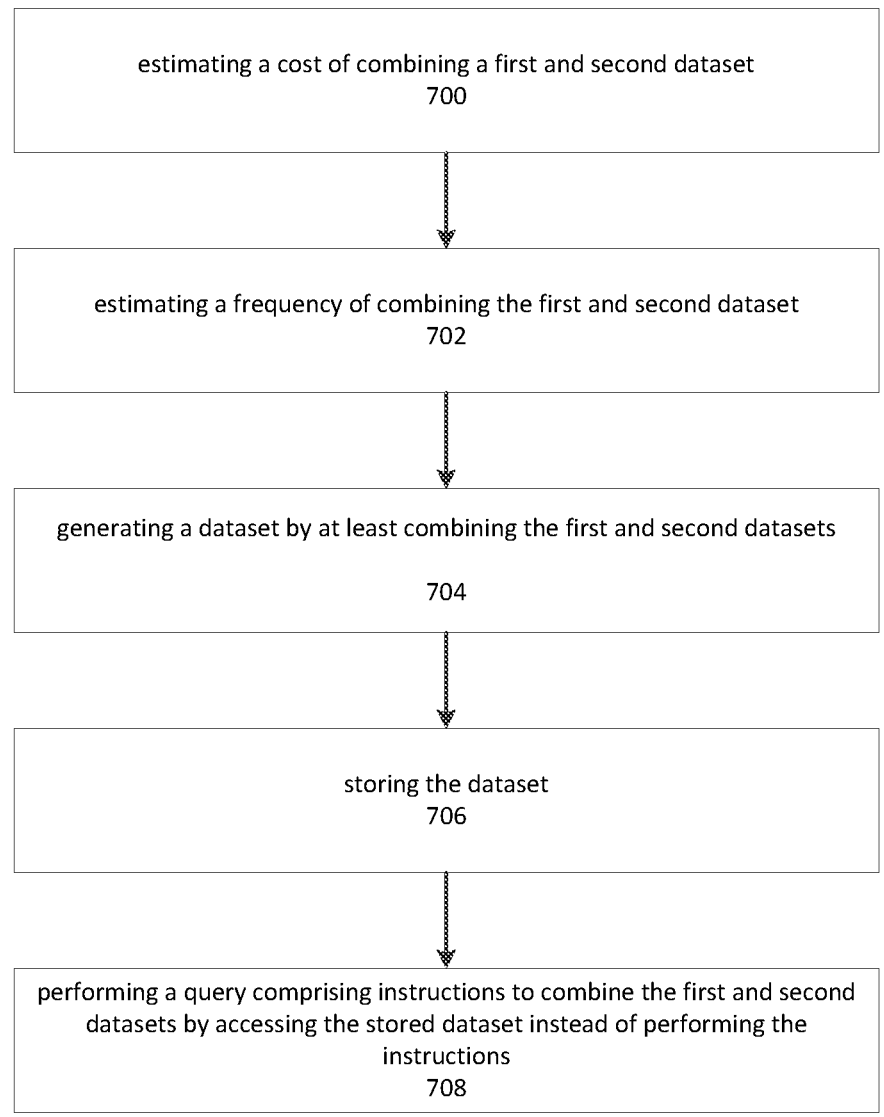
FIG. 7 is a flow diagram depicting an embodiment of a process for performing data analysis using pre-combined datasets.

FIG. 7 is a flow diagram depicting an embodiment of a process for performing data analysis using pre-combined datasets. Although depicted as a sequence of blocks, those of ordinary skill in the art will appreciate that the depicted order should not be construed as limiting the scope of the present disclosure to only embodiments which precisely match the depicted order, and that at least some of the operations referred to in the depicted blocks may be altered, omitted, reordered, supplemented with additional operations, or performed in parallel.

In an embodiment, as depicted by block 700, a process for performing data analysis using pre-combined datasets may comprise estimating the cost of combining a first dataset with a second dataset. In an embodiment, cost may include the computational power and/or time required to combine the two datasets.

In an embodiment, as depicted by block 702, the process may comprise estimating a frequency of combining the first and second datasets. In an embodiment, the frequency is determined based on a set of queries provided a priori In an embodiment, this information is accompanied by information indicative of the relative frequency each query is expected to be executed. From this information, and from analysis of the queries, it may be determined how often particular combinations of datasets will be materialized.

In an embodiment, as depicted by block 704, a dataset may be generated by combining the first and second datasets. The dataset may be generated based on, i.e. in response to, an analysis of the estimated cost and frequency of combining the first and second datasets.

In an embodiment, as depicted by block 706, the combined dataset may be stored. The dataset may be stored in one or more storage nodes, such as those depicted in FIG. 1, or using any other storage mechanism. In an embodiment, the combined datasets are stored in the main memory of a computing node.

In an embodiment, as depicted by block 708, the process may comprise performing a query comprising instructions to combine the first and second datasets. In an embodiment, the query is processed by accessing the stored dataset, containing the combined data, instead of performing the combination.

In an embodiment, the process depicted by FIG. 7 may further include receiving information indicative of queries to be performed on a collection of data comprising the first and second datasets. In an embodiment, the collection of data may include a set of data existing a priori. The collection may also include data to be added subsequently. The collection of data may include any number of datasets, some or all of which may be pertinent to the supplied queries.

In an embodiment, the process may further comprise identifying a relationship between the first and second datasets based at least in part on determining that one or more of the queries comprises instructions to combine the first and second datasets. In an embodiment, the instructions comprise a join operator in a query language expression. The dataset may be generated at least partly in response to identifying the relationship.

In an embodiment, the process may further comprise identifying a relationship between the first and second datasets based at least in part on the first dataset comprising a first column and the second dataset comprising a second column, and based at least in part on the first and second columns being used to combine other datasets. For example, a query supplied a priori might include a join statement referencing the two columns. The instructions to combine the first and second datasets may, in some embodiments, comprise a join operator in SQL or other query languages.

In an embodiment, the process may further comprise determining to store the dataset based at least in part on the cost and frequency of combining the first and second datasets. In an embodiment, the frequency is estimated based at least in part on a rate of receiving data associated with the first or second dataset. The system may, for example, receive information indicating the rate at which data is expected to be received from the various data sources. It may be determined, from this information, which datasets are likely to be associated with new data, and the rate at which such data is likely to arrive. This information may further be used in determining how often certain join operations are to be performed, since queries associated with a dataset may, in some cases, be executed on newly arrived data.

In an embodiment, the process may further comprise determining to store the dataset based at least in part on an amount of memory available to store pre-combined datasets.

In an embodiment, a system may comprise a memory to store machine-readable instructions, which if performed by a processor, cause the system at least to generate a dataset based at least in part on a combination of a first and second dataset, the dataset generated based at least in part on a cost and a frequency of combining the first and second datasets; store the dataset; and process a query comprising instructions to combine the first and second datasets by at least accessing the stored dataset.

In an embodiment, the system may comprise further machine-readable instructions, which if performed by the processor, cause the system at least to receive information indicative of a plurality of queries to be performed on a collection of data comprising the first and second datasets; and generate the dataset based at least in part on one or more of the plurality of queries comprising instructions to combine the first and second datasets.

In an embodiment, the system may comprise further machine-readable instructions, which if performed by the processor, cause the system at least to add additional combined data to the stored dataset. The additional data may be data received from various data sources, combined, and added to the stored dataset.

Figure 8:
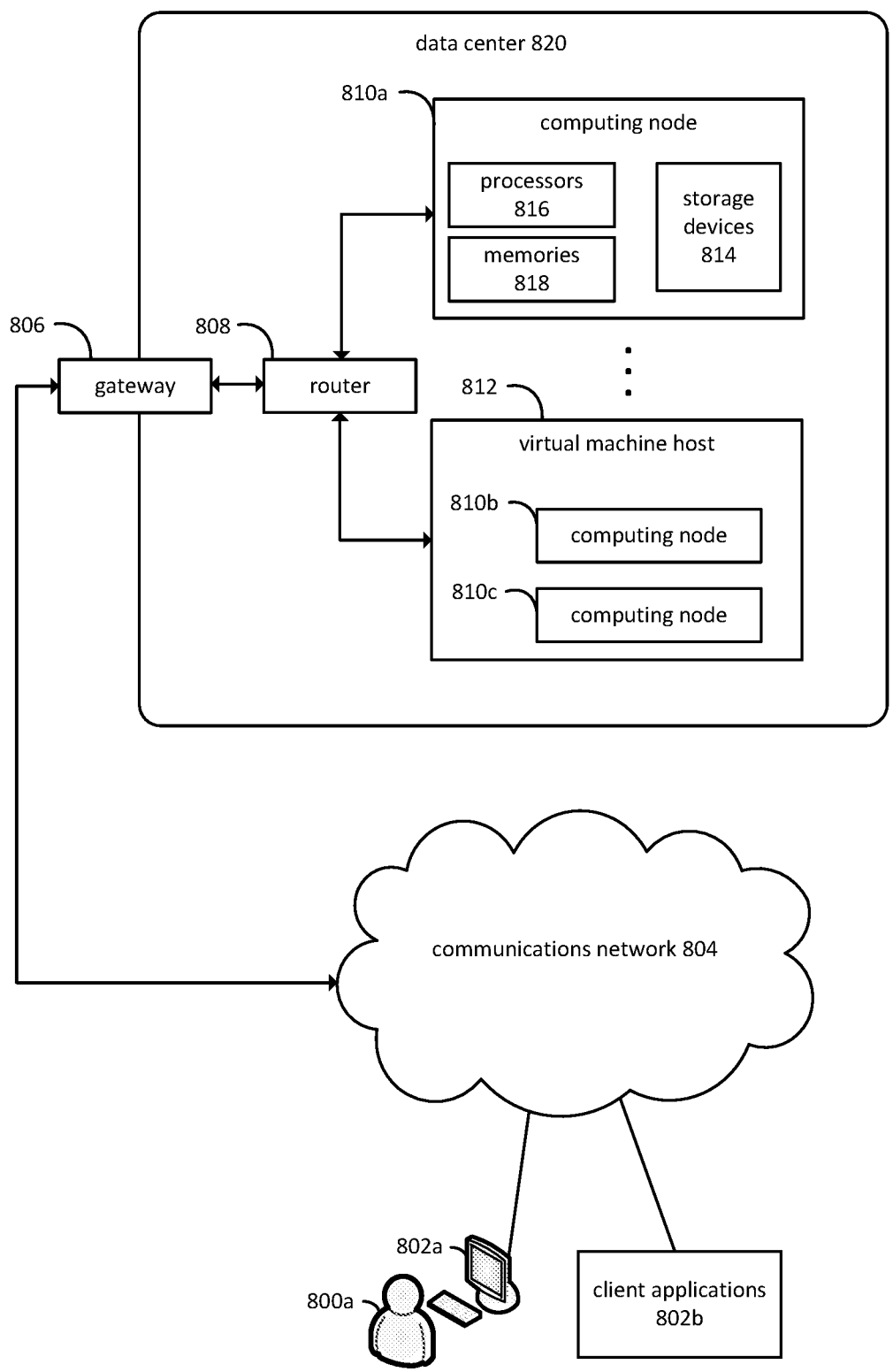
FIG. 8 is a block diagram depicting an embodiment of a computing environment in which aspects of the present disclosure may be practiced.

FIG. 8 is a block diagram depicting an embodiment of a distributed computing environment on which aspects of the present invention may be practiced. Various users 800a may interact with various client applications, operating on any type of computing device 802a, to communicate over communications network 804 with processes executing on various computing nodes 810a, 810b, and 810c within a data center 820. Alternatively, client applications 802b may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 810a, 810b, and 810c, operating within data center 820, may be provided via gateway 806 and router 808. Numerous other network configurations may also be employed. Although not explicitly depicted in FIG. 8, various authentication mechanisms, web service layers, business objects, or other intermediate layers may be provided to mediate communication with the processes executing on computing nodes 810a, 810b, and 810c. Some of these intermediate layers may themselves comprise processes executing on one or more of the computing nodes. Computing nodes 810a, 810b, and 810c, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810a is depicted as residing on physical hardware comprising one or more processors 816, one or more memories 818, and one or more storage devices 814. Processes on computing node 810a may execute in conjunction with an operating system or alternatively may execute as a bare-metal process that directly interacts with physical resources, such as processors 816, memories 818, or storage devices 814.

Computing nodes 810b and 810c are depicted as operating on virtual machine host 812, which may provide shared access to various physical resources, such as physical processors, memory, and storage devices. Any number of virtualization mechanisms might be employed to host the computing nodes.

The various computing nodes depicted in FIG. 8 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 9:
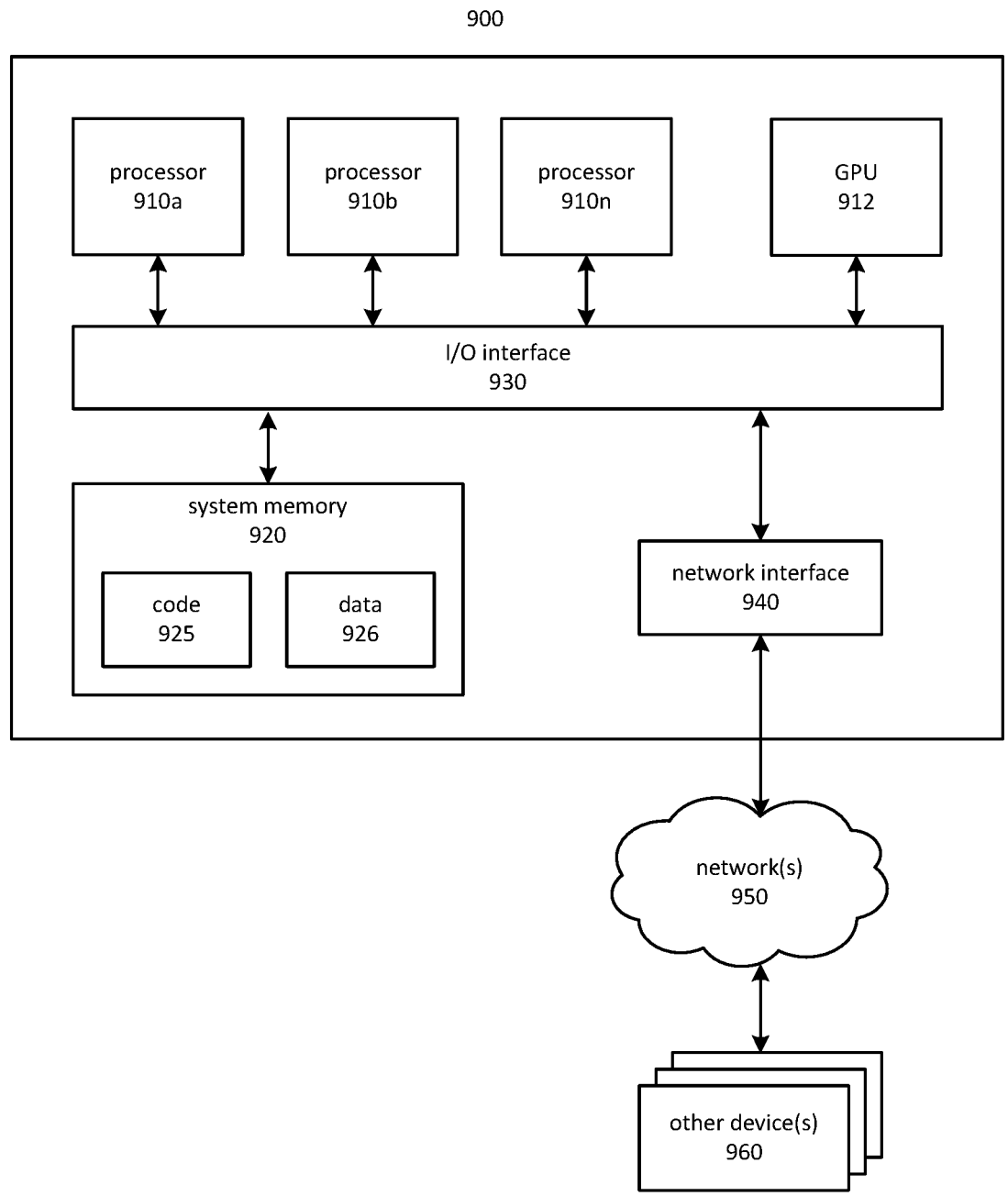
FIG. 9 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910a, 910b, and/or 910n (which may be referred herein singularly as a processor 910 or in the plural as the processors 910) coupled to a system memory 920 via an input/output ("I/O") interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures ("ISAs"), such as the x86, PowerPC, SPARC or MIPS ISAs, or any other suitable ISA. In multiprocessor systems, each of processors 910 may commonly, but not necessarily, implement the same ISA.

In some embodiments, a graphics processing unit ("GPU") 912 may participate in providing graphics rendering and/or physics processing capabilities. A GPU may, for example, comprise a highly parallelized processor architecture specialized for graphical computations. In some embodiments, processors 910 and GPU 912 may be implemented as one or more of the same type of device.

System memory 920 may be configured to store instructions and data accessible by processor(s) 910. In various embodiments, system memory 920 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect ("PCI") bus standard or the Universal Serial Bus ("USB") standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 920 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic or digital signals, conveyed via a communication medium, such as a network and/or a wireless link, such as those that may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The system memory 920 may be reconfigured by the operation of one or more of the processors 910. The processors 910 may execute the instructions of a code module and thereby reconfigure the system memory 920 to form data structures and data elements. Forming a data element may therefore refer to operations of the processor 910 to reconfigure the system memory 920. The GPU 912, network interface 940, and I/O interface may also, in some cases, form data structures by reconfiguring the system memory 920. Accordingly, the terms "form" and "forming" may also refer to the operations of these and other devices 960 which may cause the a data structure or data element to be stored in the system memory 920.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
a processor; and
a memory to store machine-readable instructions, which as result of being performed by the processor, cause the system at least to:
receive information indicative of a plurality of queries to be performed on a collection of data that is to comprise a plurality of datasets;
determine, in response to intake of the plurality of datasets, that first and second datasets are candidates for pre-combination, based at least in part on metadata describing the first and second datasets and identification of a relationship between a first column of the first dataset and a second column of the second dataset;
determine, in response to intake of the plurality of datasets, to pre-combine the first and second datasets, the determination to pre-combine based at least in part on analyses of the plurality of queries, and a cost and estimated frequency of combining the first and second datasets, wherein the estimated frequency is based at least in part on a rate of receiving data associated with the first or second dataset, wherein the determination to pre-combine the first and second datasets is based at least in part on comparing the estimated frequency to a threshold value;
generate, in response to the intake of first and second datasets and the determination to pre-combine the first and second datasets, a dataset based at least in part on a combination of the first and second datasets, wherein the intake of the first and second datasets and the generation of the dataset is completed prior to performing a query indicative of combining the first and second datasets;
store the dataset based at least in part on an amount of memory available to store pre-combined datasets; and
process the query comprising instructions to combine the first and second datasets by at least accessing the stored dataset.

2. The system of claim 1, wherein the cost and frequency are estimated based at least in part on the plurality of queries.

3. The system of claim 1, the memory to store machine-readable instructions, which as a result of being performed by the processor, cause the system at least to:
add additional combined data to the stored dataset.

4. A method, comprising:
receiving information indicative of queries to be performed on a collection of data comprising a plurality of datasets;
determining, in response to intake of the plurality of datasets, that first and second datasets are candidates for pre-combination, based at least in part on metadata of the first and second datasets and a determination of a relationship between a first column of the first dataset and a second column of the second dataset;
determining, in response to intake of the plurality of datasets, to pre-combine the first and second datasets, the determination to pre-combine based at least in part on analyses of the queries, and a cost and estimated frequency of combining the first and second datasets, wherein the estimated frequency is based at least in part on a rate of receiving data associated with the first or second dataset, wherein the determination to pre-combine the first and second datasets is based at least in part on comparing the estimated frequency to a threshold value;
generating, in response to receiving the first and second datasets and the determination to pre-combine the first and second datasets, a dataset by at least combining the first dataset with the second dataset, wherein the intake of the first and second datasets and the generation of the dataset is completed prior to performing a query indicative of combining the first and second datasets;
storing the dataset based at least in part on an amount of memory available to store the pre-combined first and second datasets; and
performing the query comprising instructions to combine the first and second datasets by at least accessing the dataset instead of performing the instructions.

5. The method of claim 4, further comprising:
identifying a relationship between the first and second datasets based at least in part on determining that one or more of the plurality of queries comprises the instructions to combine the first and second datasets; and
generating the dataset in response to identifying the relationship.

6. The method of claim 5, further comprising:
estimating the cost and frequency of combining the first and second datasets based at least in part on the plurality of queries.

7. The method of claim 4, further comprising:
identifying a relationship between the first and second datasets based at least in part on the first dataset comprising a first column and the second dataset comprising a second column, and based at least in part on the first and second columns being used to combine other datasets.

8. The method of claim 4, further comprising:
determining to store the dataset based at least in part on the cost and frequency of combining the first and second datasets.

9. The method of claim 4, wherein the instructions to combine the first and second datasets comprises a join operator.

10. A non-transitory storage medium having stored thereon machine-readable instructions that, when performed by a computing device, cause the computing device to at least:
receive information indicative of queries to be performed on a collection of data that is to comprise a plurality of datasets;
determine, in response to intake of the plurality of datasets, that first and second datasets are candidates for pre-combination, based at least in part on metadata describing the first and second datasets and identification of a relationship between a first column of the first dataset and a second column of the second dataset;
determine, in response to intake of the plurality of datasets, to pre-combine the first and second datasets, the determination to pre-combine based at least in part on analyses of the plurality of queries and an estimated frequency of pre-combining the first and second datasets, wherein the analyses of the plurality of queries are indicative of combinations of the first and second datasets, wherein the estimated frequency is based at least in part on a rate of receiving data associated with the first or second dataset, wherein the determination to pre-combine the first and second datasets is based at least in part on comparing the estimated frequency to a threshold value;

in response to receipt of the first and second datasets and the determination to pre-combine the first and second datasets, generate a dataset by at least combining the first dataset with the second dataset, wherein the receipt of the first and second datasets and generation of the dataset finishes prior to receiving a query indicative of combining the first and second datasets;

store the dataset based at least in part on an amount of memory available to store the pre-combined first and second datasets; and perform the query comprising instructions to combine the first and second datasets by at least accessing the stored dataset.

11. The non-transitory storage medium of claim 10, comprising further machine-readable instructions that, when performed by the computing device, cause the computing device to at least:

identify a relationship between the first and second datasets based at least in part on one or more of the plurality of queries comprising the instructions to combine the first and second datasets.

12. The non-transitory storage medium of claim 11, comprising further machine-readable instructions that, when performed by the computing device, cause the computing device to at least:

estimate the cost and frequency of combining the first and second datasets based at least in part on the plurality of queries.

13. The non-transitory storage medium of claim 10, comprising further machine-readable instructions that, when performed by the computing device, cause the computing device to at least:

add additional combined data to the stored dataset.

14. The non-transitory storage medium of claim 10, comprising further machine-readable instructions that, when performed by the computing device, cause the computing device to at least:

generate the dataset based at least in part on the cost and frequency of combining the first and second datasets.

15. The non-transitory storage medium of claim 10, comprising further machine-readable instructions that, when performed by the computing device, cause the computing device to at least:

generate the dataset based at least in part on an amount of memory available to store pre-joined datasets.

16. The non-transitory storage medium of claim 10, comprising further machine-readable instructions that, when performed by the computing device, cause the computing device to at least:

estimate the rate of receiving data associated with the first or second dataset.

17. The system of claim 3, further comprising the memory to store machine-readable instructions, which as a result of being performed by the processor, cause the system at least to:

form a hierarchy of data based at least in part on the additional combined data to the stored dataset.

18. The system of claim 1, wherein the intake of the first and second datasets initiates a workflow to determine to pre-combine the first and second datasets and generate the dataset.

19. The system of claim 1, the memory to store machine-readable instructions, which as a result of being performed by the processor, cause the system at least to:

identify a relationship between the first and second datasets based at least in part on one or more of the plurality of queries comprising the instructions to combine the first and second datasets.

20. The method of claim 4, wherein the intake of the first and second datasets initiates a workflow to determine to pre-combine the first and second datasets and generate the dataset.

* * * * *